US 9,907,105 B2

United States Patent
Jales et al.

(10) Patent No.: US 9,907,105 B2
(45) Date of Patent: Feb. 27, 2018

(54) PAIRING TECHNIQUES FOR NETWORK COMMUNICATIONS

(71) Applicant: FLIR Belgium BVBA, Meer (BE)

(72) Inventors: Richard Jales, Eastleigh (GB);
Stephen Tostevin, Nutbourne (GB);
Edward Hull, Fareham (GB); Andrew Mallion, Fareham (GB)

(73) Assignee: FLIR Belgium BVBA (BE)

( * ) Notice: Subject to any disclaimer, the term of this patent is extended or adjusted under 35 U.S.C. 154(b) by 0 days.

(21) Appl. No.: 15/348,935

(22) Filed: Nov. 10, 2016

(65) Prior Publication Data
US 2017/0142765 A1 May 18, 2017

Related U.S. Application Data

(60) Provisional application No. 62/255,295, filed on Nov. 13, 2015.

(51) Int. Cl.
*H04W 76/02* (2009.01)
*H04W 4/00* (2018.01)

(52) U.S. Cl.
CPC ......... *H04W 76/023* (2013.01); *H04W 4/008* (2013.01)

(58) Field of Classification Search
CPC .......................... H04W 76/021; H04W 76/023
See application file for complete search history.

(56) References Cited

U.S. PATENT DOCUMENTS

| | | | |
|---|---|---|---|
| 6,772,331 B1 | 8/2004 | Hind et al. | |
| 6,783,071 B2 | 8/2004 | Levine et al. | |
| 7,174,130 B2 | 2/2007 | Kurisko et al. | |
| 7,254,367 B2 | 8/2007 | Helden et al. | |
| 7,813,715 B2 | 10/2010 | McKillop et al. | |
| 8,271,662 B1 | 9/2012 | Gossweiler, III et al. | |
| 8,301,714 B2 | 10/2012 | Johnson et al. | |
| 2002/0090912 A1 | 7/2002 | Cannon et al. | |
| 2004/0253923 A1 | 12/2004 | Braley et al. | |
| 2005/0015618 A1 | 1/2005 | Schneider et al. | |
| 2005/0048919 A1 | 3/2005 | Jeannerod | |

(Continued)

OTHER PUBLICATIONS

"Wi-Fi Protected Setup", Wikipedia, The Free Encyclopedia, Oct. 7, 2015, 7 pages [online], [retrieved on May 5, 2017]. Retrieved from the Internet: <URL: https://en.wikipedia.org/wiki/Wi-Fi_Protected_Setup>.

(Continued)

*Primary Examiner* — Tuan H Nguyen
(74) *Attorney, Agent, or Firm* — Haynes and Boone, LLP (57) ABSTRACT

Various techniques are provided to securely pair devices using default connection information. In one example, a method includes storing, on a first device, a connection list comprising a plurality of connection entries. The first device selects a default connection entry in the connection list. A secure default connection is established between the first device and a second device using the default connection entry. Defined connection information is received at the first device from the second device over the secure default connection. The defined connection information is stored in a defined connection entry of the connection list. A secure defined connection between the first device and the second device is established using the defined connection entry.

20 Claims, 6 Drawing Sheets

(56) References Cited

U.S. PATENT DOCUMENTS

| | | |
|---|---|---|
| 2005/0152294 A1 | 7/2005 | Yu et al. |
| 2006/0068760 A1 | 3/2006 | Hameed et al. |
| 2006/0116107 A1 | 6/2006 | Hulvey |
| 2006/0143455 A1 | 6/2006 | Gitzinger |
| 2006/0166718 A1 | 7/2006 | Seshadri et al. |
| 2006/0250980 A1 | 11/2006 | Pereira et al. |
| 2007/0184847 A1 | 8/2007 | Hansen et al. |
| 2008/0057868 A1 | 3/2008 | Chang |
| 2008/0070501 A1 | 3/2008 | Wyld |
| 2008/0102793 A1 | 5/2008 | Ananthanarayanan et al. |
| 2008/0113618 A1 | 5/2008 | De Leon et al. |
| 2008/0146265 A1 | 6/2008 | Valavi |
| 2008/0227393 A1 | 9/2008 | Tang et al. |
| 2008/0320587 A1 | 12/2008 | Vauclair et al. |
| 2009/0318114 A1 | 12/2009 | Bertoni |
| 2009/0325491 A1 | 12/2009 | Bell et al. |
| 2010/0012715 A1 | 1/2010 | Williams et al. |
| 2010/0195539 A1* | 8/2010 | Tian ............ H04L 47/824 370/255 |
| 2011/0028091 A1 | 2/2011 | Higgins et al. |
| 2012/0083209 A1* | 4/2012 | Giles ............ H04W 4/206 455/41.2 |
| 2015/0268328 A1* | 9/2015 | Johnson ............ G01S 7/03 342/21 |

OTHER PUBLICATIONS

"Wi-Fi Direct", Wikipedia, The Free Encyclopedia, Oct. 7, 2015, 4 pages [online], [retrieved on May 5, 2017]. Retrieved from the Internet: <URL:https://en.wikipedia.org/wiki/Wi-Fi_Protected_Setup>.

"Near field communication", Wikipedia, The Free Encyclopedia, Oct. 7, 2015, 13 pages [online], [retrieved on May 5, 2017]. Retrieved from the Internet: <URL:https://en.wikipedia.org/wiki/Near_field_communication.

* cited by examiner

PAIRING TECHNIQUES FOR NETWORK COMMUNICATIONS

CROSS-REFERENCE TO RELATED APPLICATIONS

This application claims the benefit of and priority to U.S. Provisional Patent Application No. 62/255,295 filed Nov. 13, 2015 and entitled "PAIRING TECHNIQUES FOR NETWORK COMMUNICATIONS" where is hereby incorporate by reference in its entirety.

TECHNICAL FIELD

The present invention relates generally to network technology and, more particularly, to pairing techniques for connecting new devices to a network.

BACKGROUND

Devices connected over wireless networks using Wi-Fi, Bluetooth, and/or other protocols typically require a pairing process to establish a secure connection. For example, a user may be presented with an interface to select an available network corresponding to a particular Service Set Identification (SSID), and enter a passphrase or other security information. In some cases, the device will include a display, keyboard, and/or touch screen which makes such operations relatively straightforward. In other cases, the device may include a physical button to initiate a pairing process (e.g., a Wi-Fi Protected Setup (WPS) process).

Unfortunately, some devices may not be compatible with such pairing techniques. For example, devices made for hostile or rugged environments (e.g., an engine room of a watercraft) may not include user displays or buttons. Other devices made for relatively inaccessible locations (e.g., on a mast of a watercraft) may not even be viewable or physically touched by a user, making displays or buttons unusable even when provided.

The pairing of such devices is further complicated by the fact that a new out-of-the-box device may not know the correct network or security information used by other devices with which it is to be paired. Indeed, even if the network or security information was once known, it may be changed from time to time. As such, it can be cumbersome and difficult to update all of the devices in a system with new network or security information—particularly those devices that lack appropriate user interfaces and/or are mounted in inaccessible locations as discussed.

SUMMARY

In accordance with embodiments discussed herein, various techniques are provided to securely pair devices using default connection information. Once paired in accordance with the default connection, new defined connection information may be passed over the secure default connection. Thereafter, another secure connection may be established using the new defined connection information. In some embodiments, devices may be selectively configured in station mode or access point mode. In some embodiments, connection information may be polled from devices, collected, and then distributed to other networked devices. In some embodiments, various recovery mode operations may be provided.

In one embodiment, a method includes storing, on a first device, a connection list comprising a plurality of connection entries; selecting, by the first device, a default connection entry in the connection list; establishing a secure default connection between the first device and a second device using the default connection entry; receiving, at the first device over the secure default connection, defined connection information from the second device; storing the defined connection information in a defined connection entry of the connection list; and establishing a secure defined connection between the first device and the second device using the defined connection entry.

In another embodiment, a system includes a first device comprising: a memory component configured to store a connection list comprising a plurality of connection entries; a network interface; and a processor configured to: select a default connection entry in the connection list, establish a secure default connection between the first device and a second device through the network interface using the default connection entry, receive, over the secure default connection, defined connection information from the second device, store the defined connection information in a defined connection entry of the connection list, and establish a secure defined connection between the first device and the second device through the network interface using the defined connection entry.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques are provided to securely pair devices for network communications. In some embodiments, the techniques described herein may be used to permit network configuration of devices that have no user interface or display (e.g., displayless devices) and/or are positioned in inaccessible locations. Although such techniques will be described primarily with regard to wireless network communications for displayless devices, they may also be applied to wired networks and/or combinations of wireless and wired networks and/or devices having displays where appropriate.

In one embodiment, a newly added device maintains a list of network connections including default connections (e.g., typically based on a device's unique serial number) and additional connections (e.g., added when new network connection information is received from other devices). For example, in some embodiments, each network connection entry in the connection list may include an SSID, a passphrase, and an operating mode designation (e.g., station or access point).

When initially powered on (e.g., an out-of-the-box state), the new device may repeatedly attempt to establish a network connection with one or more user devices by the various default connection entries in the connection list until a successful connection is made. The default connections may include station mode connections (e.g., where the new device is configured as a station and attempts to connect to the user device configured as an access point) and access point connections (e.g., where the new device is configured as an access point for the user device configured as a station). As a result, both station mode connections and access point mode connections may be supported by various devices where appropriate.

Furthermore, Wi-Fi Direct mode connections, which may include aspects of both station mode connections and access point mode connections, may be supported by various devices where appropriate.

The user device may be informed of one or more of the default connections, for example, based on a user's entry of such information (e.g., provided by a user manual of the new device and/or associated with a serial number of the new device). As a result, a secure default connection may be established between the new device and the user device.

After the secure default connection is established, one or both of the devices may pass each other new connection information (e.g., SSID, passphrase, and connection mode) over the secure default connection, and the new connection information is then stored as one or more defined connection entries. The devices may subsequently establish a new secure connection using the new connection information. Moreover, the new connection information may be conveniently updated by resetting the devices as appropriate to reestablish the default connection automatically and then passing the new connection information as discussed.

In another embodiment, connection information for a plurality of connected devices may be gathered and distributed to the various devices and added to their associated connection lists. As a result, each device is not required to be further configured in order to establish connections with the other devices.

In another embodiment, a new device may be implemented with a recovery mode in which the device may be temporarily be operated with a known SSID and passphrase (e.g., following a power cycle or reset operation) to permit connections with other devices for a brief time (e.g., several minutes) in the event that other connection techniques are not available. These and other features are further discussed herein.

Figure 1:
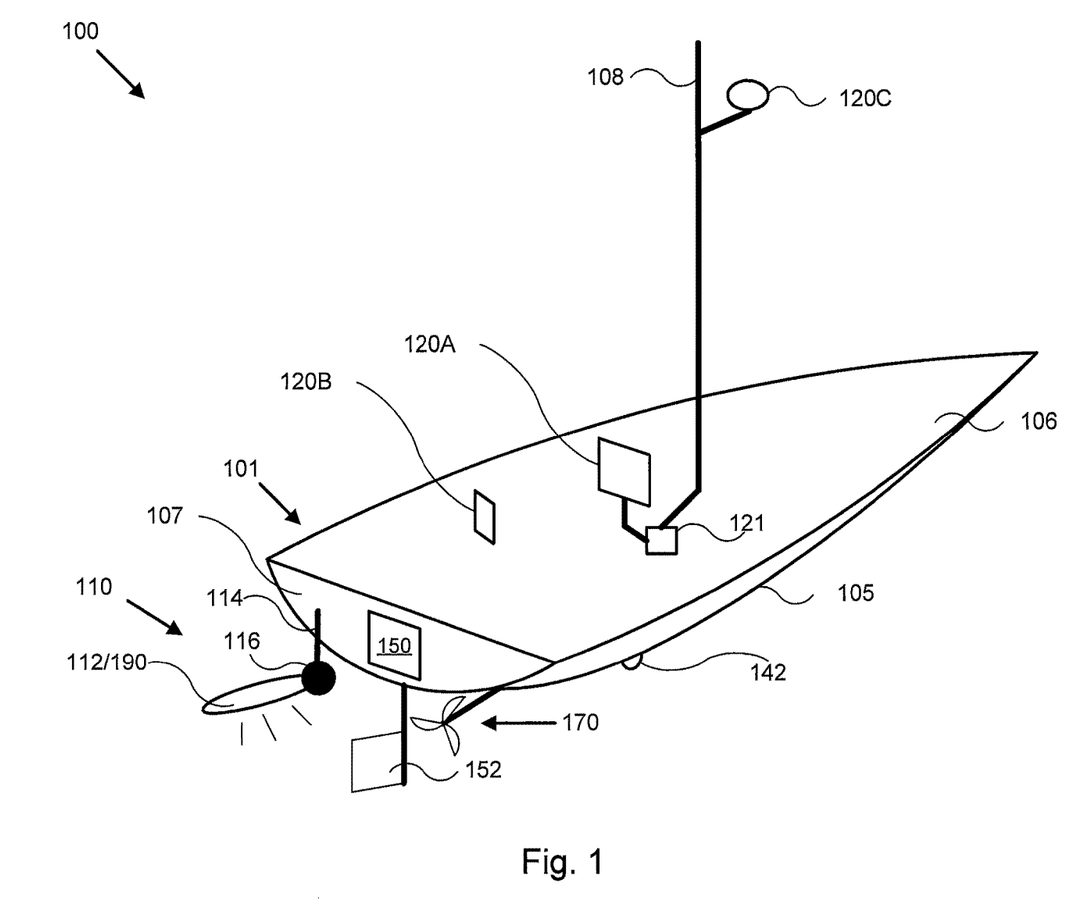
FIG. 1 illustrates a mobile structure with various devices that may be networked together in accordance with an embodiment of the present disclosure.

Turning now to the drawings, FIG. 1 illustrates a system 100 including a mobile structure 101 (e.g., a watercraft) with various devices 120 (e.g., individually identified as devices 120A, 120B, and 120C) that may be networked together in accordance with an embodiment of the present disclosure.

As shown, devices 120 may be distributed at various positions in relation to mobile structure 101. Network connections may be established between devices 120 in accordance with the various techniques described herein. In some embodiments, device 120A may be a user device such as a user interface/controller (e.g., a multifunction display), device 120B may be a user device such as a mobile phone, and device 120C may be a newly added device lacking a display and user control (e.g., a radar system).

For example, when implemented as a user interface/controller, user device 120A may communicate (e.g., wired and/or wirelessly) with other components of mobile structure 101 to receive and display information (e.g., radar information, sonar information, position information, speed information, or other information) to a user. User device 120A may also receive user inputs to control the various components of mobile structure 101.

User device 120B may be implemented, for example, as a mobile phone configured to wirelessly communicate with devices 120A and/or 120B. For example, in some embodiments, user device 120B may be used to receive and display information in a similar manner as discussed with regard to user device 120A.

New device 120C may be implemented, for example, as a radar system configured to provide radar return information to devices 120A and 120B and receive commands from such devices where appropriate. For example, new device 120C may be implemented, for example, with a radar antenna platform and actuator configured to rotate the radar antenna about a vertical axis (e.g., substantially corresponding to a mast 108 of mobile structure 101).

In the embodiment illustrated by FIG. 1, mobile structure 101 is implemented as a motorized boat including a hull 105, a deck 106, a transom 107, a mast/sensor mount 108, a speed sensor 142, a rudder 152, a steering actuator 150 (e.g., to control rudder 152), a propulsion system (e.g., an inboard motor 170), an electrical power source 121 (e.g., a battery, generator, or other appropriate type of power source providing electrical power to user device 120A, new device 120C, and/or other components as appropriate), and an actuated sonar system 110. In other embodiments, some or all of such components may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1, actuated sonar system 110 includes an orientation and/or position sensor (OPS) 190 integrated with a transducer assembly 112, which are coupled to transom 107 through an assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided, for example, by device 120A.

Although a particular configuration is illustrated in FIG. 1, each component of system 100 may be located at positions different from those depicted in FIG. 1, as appropriate for various embodiments. In addition, although two user devices 120A/120B and one new device 120C are shown, any number of such devices may be provided in other embodiments and operated in accordance with the various techniques discussed herein.

Figure 2:
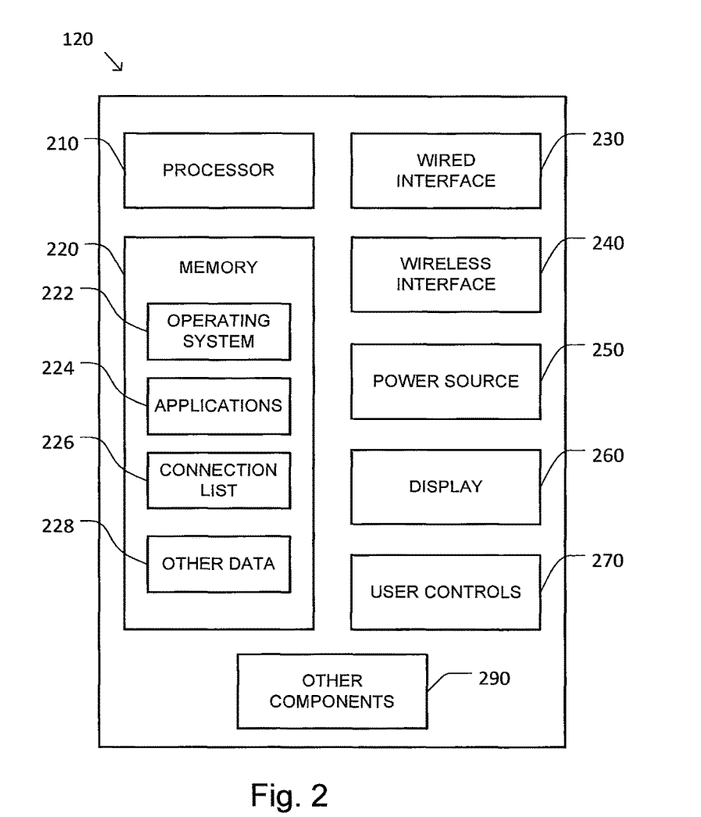
FIG. 2 illustrates a block diagram of a device that may be networked in accordance with an embodiment of the present disclosure.

FIG. 2 illustrates a block diagram of an example device 120 that may be networked in accordance with an embodiment of the present disclosure. In this regard, each of devices 120A, 120B, and 120C may be implemented one or more of the components illustrated in FIG. 2 to support the various network connection techniques discussed herein. Although the various features of FIG. 2 will be described with regard to particular devices 120A, 120B, and 120C, any of the various components of mobile structure 101 may be implemented with such features where appropriate to support the various network connection techniques described herein. For example, devices 120A, 120B, and/or 120C may correspond to a radar system, other types of ranging systems, a global navigation satellite system (GNSS), a heading sensor, a water speed sensor, an orientation/attitude sensor, a visible spectrum camera, an infrared camera, and or other devices. Moreover, devices 120A, 120B, and/or 120C may include devices not limited to the context of a mobile structure. For example, devices 120A, 120B, and/or 120C may correspond to a central heating controller/monitor (e.g., a boiler controller or monitoring system), a monitoring device for a security system (e.g., a water level flood monitor, security cameras, smoke, flow, humidity, and/or temperature monitors), a controller for such systems, various household or commercial appliances (e.g., to simplify network security for the elderly or disabled), and/or other devices and/or systems.

As shown, an example device 120 may include a processor 210, a memory 220, a wired interface 230, a wireless interface 240, a power source 250, a display 260, user controls 270, and/or other components 290. Although a variety of components are illustrated in the block diagram of FIG. 2, components may be added and/or omitted for different types of devices as appropriate in various embodiments.

Processor 210 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of device 120. In this regard, processor 210 may execute machine readable instructions (e.g., software, firmware, or other instructions) stored in memory 220.

Memory 220 may be implemented as a machine readable medium storing various machine readable instructions and data. For example, in some embodiments, memory 220 may store an operating system 222 and one or more applications 224 as machine readable instructions that may be read and executed by processor 210 to perform various operations described herein. Memory 220 may also store a connection list 226 and/or various other data 228 as appropriate. In some embodiments, memory 220 may be implemented as non-volatile memory (e.g., flash memory, hard drive, solid state drive, or other non-transitory machine readable mediums), volatile memory, or combinations thereof.

Wired interface 230 may be implemented as one or more physical network interfaces (e.g., Ethernet, and/or other protocols) configured to connect device 120 with various external devices for wired communications. Wireless interface 240 may be implemented as one or more WiFi, Bluetooth, cellular, infrared, radio, and/or other types of network interfaces for wireless communications. In some embodiments, example device 120 may be implemented with only one of wired interface 230 or wireless interface 240.

Power source 250 may be implemented, for example, as one or more batteries and/or power connections to permit mobile and/or stationary use of example device 120. When implemented as a power connection, power source 250 may be coupled, for example, to power source 121 of mobile structure 101.

Display 260 presents information to the user of example device 120. In various embodiments, display 260 may be implemented as a liquid crystal display (LCD), an organic light emitting diode (OLED) display, and/or any other appropriate display. Although display 260 is illustrated in FIG. 2, some embodiments of devices 120 (e.g., displayless devices such as radar system device 120C) may not include display 260.

User controls 270 receive user input to operate features of device 120. In various embodiments, user controls 270 may be implemented as one or more physical buttons, keyboards, levers, joysticks, and/or other controls. In some embodiments, user controls 270 may be integrated with display 260 as a touchscreen (e.g., in user interface/controller device 120A and/or in mobile phone device 120B). Although user controls 270 are illustrated in FIG. 2, some embodiments of devices 120 (e.g., radar system device 120C) may be implemented without user controls 270.

Other components 290 may also be provided as appropriate to support, for example, specific features of a particular device 120 (e.g., radar components in the case of radar system device 120C). For example, other components 290 may include a GNSS antenna, a magnetometer, a visible spectrum and/or infrared imaging sensor, a temperature, humidity, water, smoke, and/or other environmental sensor, a flow wheel, an appliance motor, controller, and/or operational sensor, and/or other components, as appropriate.

Figure 3:
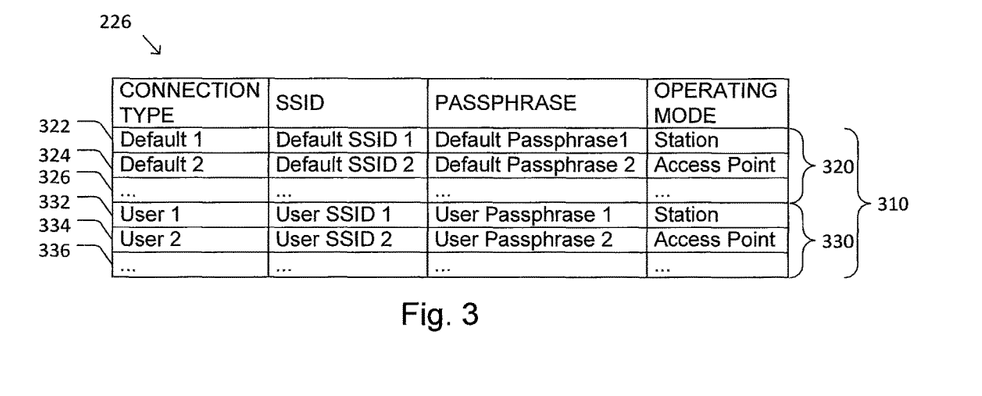
FIG. 3 illustrates an example connection list in accordance with an embodiment of the present disclosure.

FIG. 3 illustrates an example connection list 226 in accordance with an embodiment of the present disclosure. Each device 120 may include a connection list that includes a plurality of connection entries 310, each of which identifies an SSID, a passphrase, and an operating mode. Connection entries 310 include default connection entries 320 and defined connection entries 330.

Default connection entries 320 may be initially provided with the device 120 from the factory and, in some embodiments, may not be modified by a user or otherwise. In the particular embodiment illustrated in FIG. 3, two default connection entries 322 and 324 are specifically identified. In this regard, default connection entry 322 configures device 120 as a station, while default connection entry 324 configures device 120 as an access point. Additional default connection entries 326 may also be provided.

In some embodiments, defined connection entries 330 may be initially empty (e.g., not populated) when the device 120 is provided from the factory and/or added to system 100. In this regard, defined connection entries 330 may be subsequently populated and/or updated in response to new connection information received from other devices 120. In the particular embodiment illustrated in FIG. 3, two defined connection entries 332 and 334 are specifically identified. In this regard, defined connection entry 332 configures device 120 as a station, while defined connection entry 334 configures device 120 as an access point.

Additional defined connection entries 336 may also be provided.

Figure 4:
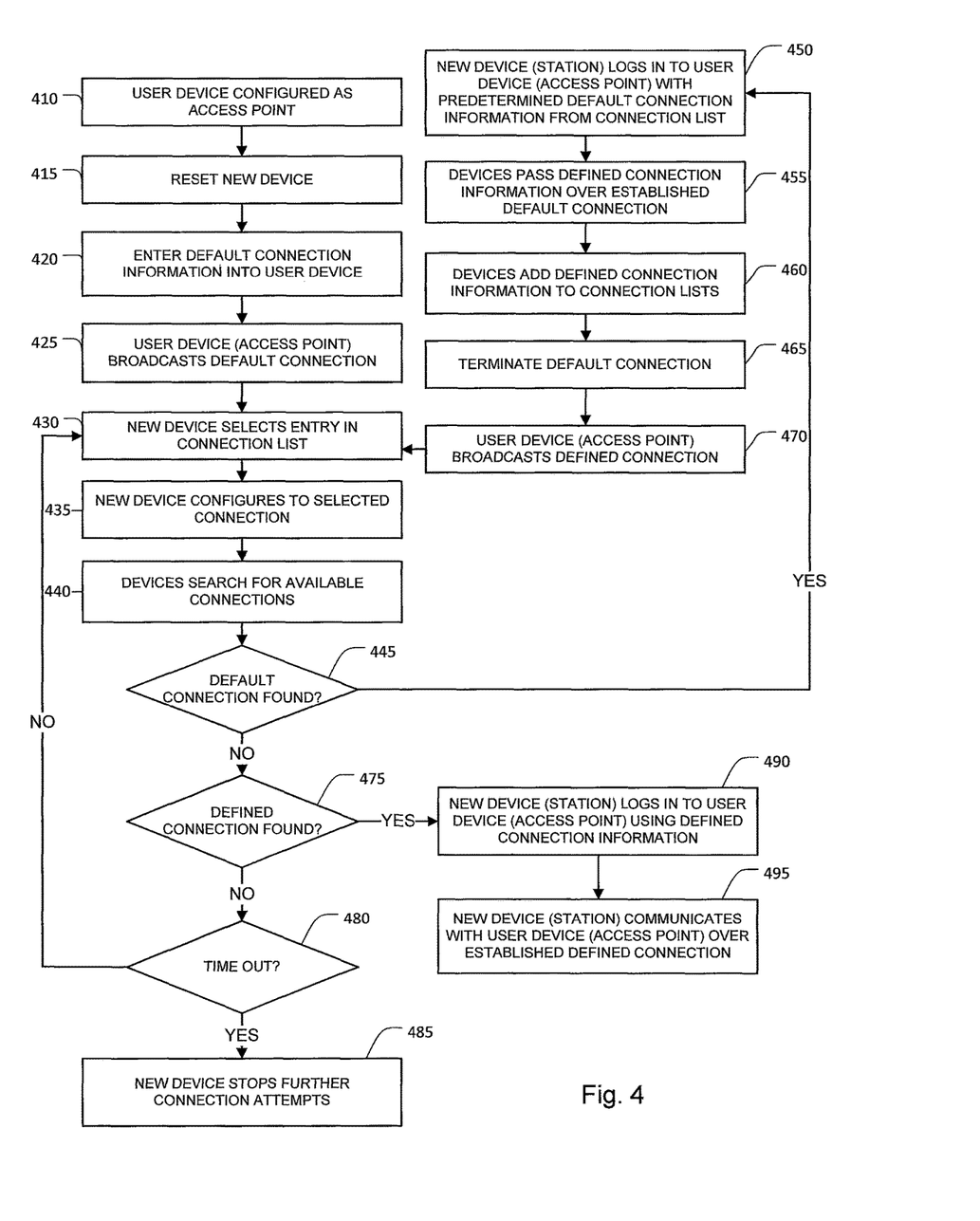
FIG. 4 illustrates a process to connect a user device configured as an access point with a newly added device configured as a station in accordance with an embodiment of the present disclosure.

FIG. 4 illustrates a process to connect user device 120A configured as an access point with new device 120C configured as a station in accordance with an embodiment of the present disclosure.

In block 410, user device 120A may be initially configured as an access point. For example, in some embodiments, user device 120A may be implemented as user interface/controller such as a multifunctional display having an integrated access point. In this regard, user device 120A may operate as a master device for system 100 and provide overall switching and routing operations for the various networked devices of system 100.

In block 415, new device 120C is reset, for example, by a user powering on the device (e.g., by switching power source 121 on) which causes new device 120C to boot into a default state.

In block 420, a user accesses user device 120A and enters predetermined default connection information into user device 120A. User device 120A may run software which permits the user to enter, for example, the default SSID and corresponding passphrase for default connection entry 332 stored in the connection list 226 of new device 120C. For example, in some embodiments, the default SSID and corresponding passphrase may be initially provided to the user in product information associated with new device 120C (e.g., a user manual or other information available online and/or in paper form). In other embodiments, user device 120A may run software configured to determine the default SSID and corresponding passphrase in response to the user entering the serial number or other information associated with new device 120C (e.g., by using the serial number as the input to a process and/or by looking up an association between the serial number and the SSID/passphrase locally and/or online).

In block 425, user device 120A operates as an access point and broadcasts the SSID corresponding to the default connection information previously entered in block 420 (e.g., "Default SSID 1" for default connection entry 322).

In block 430, new device 120C selects a default connection entry in connection list 226. In block 435, new device 120C configures itself in accordance with the selected default connection entry. For example, if default connection entry 322 is selected, new device 120C configures as a station seeking an access point broadcasting "Default SSID 1". If default connection entry 324 is selected, new device 120C configures as an access point broadcasting "Default SSID 2".

In block 440, user device 120A and new device 120C search for available default connections. In this regard, user device 120A continues to broadcast SSID "Default SSID 1" and new device 120C operates in accordance with the selected default connection entry.

If default connection entry 322 was selected in block 430, then new device 120C operates as a station and scans for an available access point broadcasting SSID "Default SSID 1". As discussed, user device 120A has been configured as an access point and is indeed broadcasting SSID "Default SSID 1" of default connection entry 322. Accordingly, in block 445, new device 120C will detect the default connection broadcasted by user device 120A and the process continues to block 450.

In block 450, new device 120C logs in to user device 120A using the default connection. In this regard, new device 120C will already know the appropriate passphrase from default connection entry 322 stored by new device 120C in connection list 226. As a result, user device 120A and new device 120C will be securely connected with each other over the established default connection.

Accordingly, in block 455, the devices pass new connection information corresponding to one or more defined (e.g., non-default) connections, and this information may be passed securely over the already established default connection. For example, a user of user device 120A may prefer to use a non-default connection when connecting to new device 120C. As a result, user device 120A may pass connection information to new device 120C for a new defined (e.g., non-default) connection. In block 460, new device 120C adds this new defined connection information to connection list 226 as a defined connection entry 332.

As discussed, in some embodiments, defined connection entries 330 may be initially empty (e.g., not populated) when the device 120 is provided from the factory and/or added to system 100. Accordingly, in such embodiments, block 460 may include populating empty configuration entries with the newly received defined connection information.

In some embodiments, defined connection entries 330 may be already populated with previously received defined connection information. Accordingly, in such embodiments, block 460 may include updating the already populated defined connection entries with the newly received defined connection information and/or populating empty configuration entries with the newly received defined connection information.

Although blocks 455 and 460 have been discussed in relation to user device 120A providing new defined connection information to new device 120C, it is also contemplated that such information may be provided from new device 1200 to user device 120A where appropriate.

In block 465, the default connection previously established in block 450 is terminated. For example, user device 120A may stop broadcasting SSID "Default SSID 1" corresponding to default connection entry 322. In block 470, user device 120A begins broadcasting the SSID corresponding to the new defined connection entry 332 (e.g., "User SSID 1" previously provided from user device 120A to new device 120C in block 455). Thereafter, the process returns to block 430.

The process may then loop through blocks 430 through 480 as user device 120A continues to broadcast the SSID of the new defined connection and new device 120C cycles through different connection entries until new defined connection entry 322 is selected and a corresponding connection is therefore found in block 475.

For example, in the next iteration of block 430, new device 120C may again select default connection entry 322 in block 430 and again scan for an available access point broadcasting an SSID corresponding to default connection entry 322. As discussed, user device 120A has switched to broadcasting SSID "User SSID 1" corresponding to the new defined connection entry 332. As a result, user device 120A and new device 120C will be set to different connections. In this case, new device 120C will not detect an available default connection in block 445 (e.g., because user device 120A is not broadcasting it), and will also not detect an available defined connection in block 475 (e.g., because user device 120C is not currently configured to scan for a defined connection). If a predetermined time has not yet elapsed (block 480), then the process will loop back to block 430 where new device 120C selects the next entry in connection list 226. Otherwise, if a time out has occurred (block 480), then new device 120C may stop further connection attempts (block 485).

In each loop of blocks 430 to 480, new device 120C selects another entry in connection list 226 until a matching connection is found. In this case, the loop will continue until new device 120C selects new defined connection entry 332 which configures new device 120C as a station to scan for SSID "User SSID 1" currently broadcasted by user device 120A. As a result, new device 120C logs in to user device 120A using new defined connection entry 332 (block 490), and the devices communicate with each other over the new defined connection (block 495).

Although the process of FIG. 4 has been discussed with regard to new device 120C operating as a station logging in to an access point provided by user device 120A, other embodiments are contemplated. For example, the discussed techniques may be used to permit another user device 120B to operate as a station that logs in to the access point provided by user device 120A.

Figure 5:
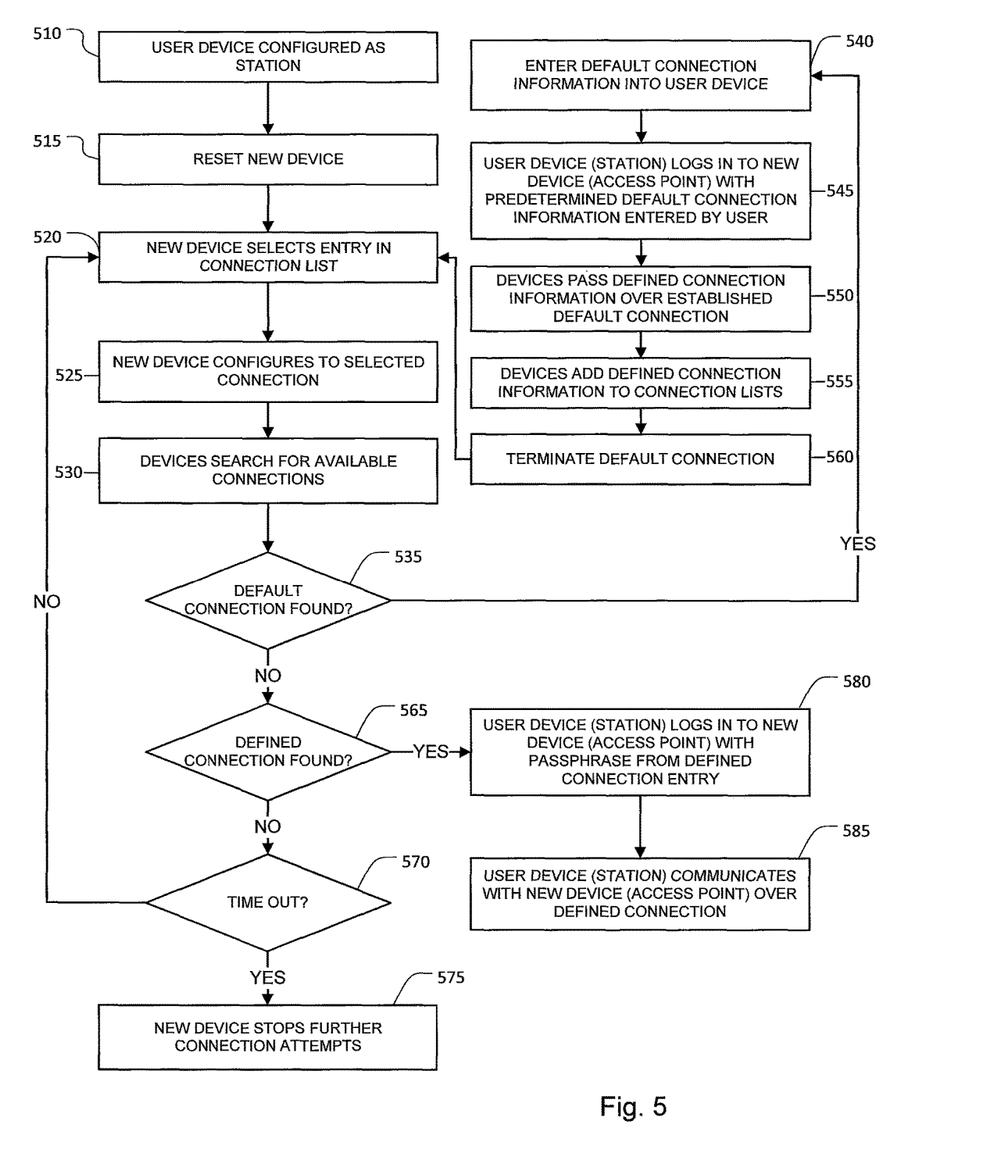
FIG. 5 illustrates a process to connect a user device configured as a station with a newly added device configured as an access point in accordance with an embodiment of the present disclosure.

FIG. 5 illustrates a process to connect user device 120B configured as a station with new device 120C configured as an access point in accordance with an embodiment of the present disclosure. In block 510, user device 120B may be initially configured as a station and scans for available access points. For example, in some embodiments, user device 120B may be implemented as a mobile phone configured to connect to another device (e.g., new device 120C) providing an access point.

In block 515, new device 120C is reset, for example, as discussed with regard to block 415 of FIG. 4. In block 520, new device 120C selects a default connection entry in connection list 226. In block 525, new device 120C configures itself in accordance with the selected default connection entry. As discussed, if default connection entry 322 is selected, new device 120C configures as a station seeking an access point broadcasting "Default SSID 1". If default connection entry 324 is selected, new device 120C configures as an access point broadcasting "Default SSID 2".

In block 530, user device 120B and new device 120C search for available default connections. In this regard, user device 120B continues to scan for available access points and new device 120C operates in accordance with the selected default connection entry.

If default connection entry 324 was selected in block 520, then new device 120C operates as an access point and broadcasts SSID "Default SSID 2". As discussed, user device 120B has been configured as an station and is scanning for available access points. Accordingly, in block 535, user device 120B will detect the default connection broadcasted by new device 1200 and the process continues to block 540.

In block 540, a user accesses user device 120C and enters predetermined default connection information into user device 120B in the manner discussed with regard to block 420 of FIG. 4. In block 545, user device 120B logs in to new device 120C using the default connection. In this regard, user device 120B will already know the appropriate passphrase as a result of the user entry performed in block 540, and this will match the corresponding passphrase of default connection entry 324 stored by new device 120C in connection list 226. As a result, user device 120B and new device 120C will be securely connected with each other over the established default connection.

Accordingly, in block 550, the devices pass new connection information in the manner discussed with regard to block 455 of FIG. 4. For example, user device 120B may pass new connection information to new device 120C for a new defined (e.g., non-default) connection. In block 555, new device 120C adds this new defined connection information to connection list 226 as a defined connection entry 334 as similarly discussed with regard to block 460 of FIG. 4. Although blocks 550 and 555 have been discussed in relation to user device 120B providing new defined connection information to new device 120C, it is also contemplated that such information may be provided from new device 120C to user device 120B where appropriate.

In block 560, the default connection previously established in block 545 is terminated. For example, new device 1200 may stop broadcasting SSID "Default SSID 2" corresponding to default connection entry 324. Thereafter, the process returns to block 520.

The process may then loop through blocks 520 through 570 as user device 120B continues to scan for available access points and user device 120C cycles through different connection entries until new defined connection entry 334 is selected and a corresponding connection is therefore found in block 565, or if a time out occurs in block 570. If a time out occurs (block 570), then new device 120C may stop further connection attempts (block 575).

If a connection is found (block 565), then user device 120B logs in to user device 120C (block 580) in accordance with new defined connection entry 334 (e.g., previously passed between the devices in block 550). The devices then communicate with each other over the new defined connection (block 585).

Although the process of FIG. 5 has been discussed with regard to user device 120B operating as a station logging in to an access point provided by new device 120C, other embodiments are contemplated. For example, the discussed techniques may be used to permit user device 120A to operate as a station that logs in to the access point provided by new device 120C.

Figure 6:
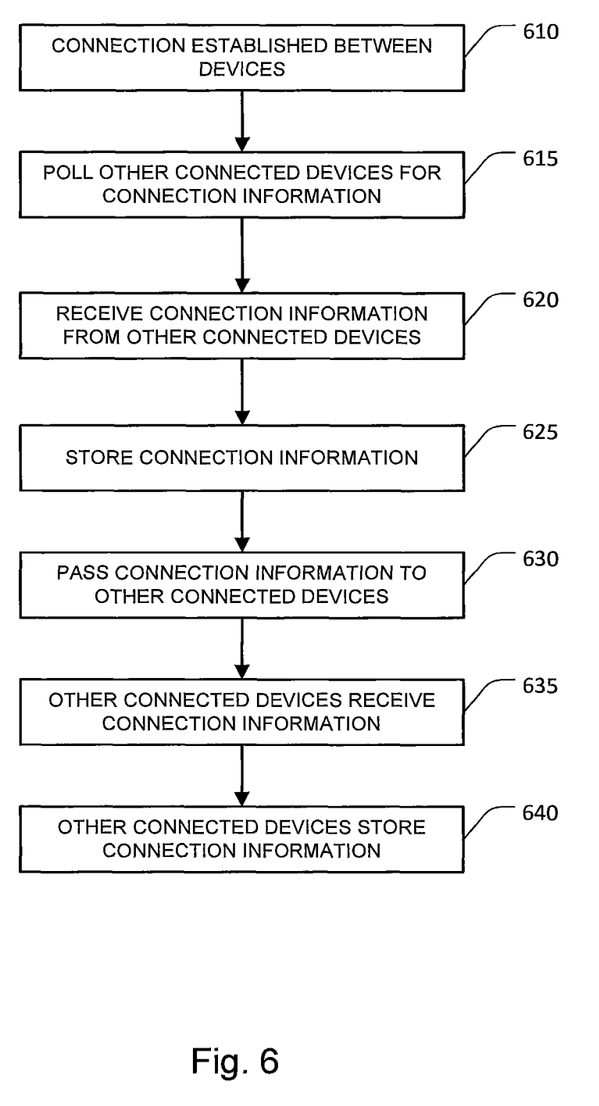
FIG. 6 illustrates a process to share connection information between various devices in accordance with an embodiment of the present disclosure.

FIG. 6 illustrates a process to share connection information between various devices in accordance with an embodiment of the present disclosure. For example, the process of FIG. 6 may be performed to distribute connection information among multiple devices 120.

In block 610, a connection (e.g., a default connection or a defined connection) is established between two or more of devices 120A, 120B, and/or 120B, for example, using the techniques discussed with regard to FIGS. 4 and 5. For example, in one embodiment, user device 120A may operate as an access point, user device 120B may operate as a station, and new device 120C may operate as a station. As a result, user device 120B and new device 120C may log in to the access point provided by user device 120A. In another embodiment, user device 120A may operate as a station, user device 120B may operate as a station, and new device 120C may operate as an access point. As a result, user device 120A and user device 120B may log in to the access point provided by new device 120C.

In block 615, one of the connected devices polls (e.g., requests) the other connected devices for connection information. For example, such connection information may include default connection entries 320 and/or new defined connection entries 330 maintained in connection lists 226 of the other devices. In block 620, the polling device receives the requested connection information. In block 625, the polling device stores the requested connection information in its own connection list 226.

In block 630, the polling device passes the requested connection information to any of the other connected devices that may not yet have such information. In block 635, the other devices receive the passed connection information. In block 640, the other devices store the connection information in their own connection lists 226.

As a result, the connection lists 226 maintained by various devices 120 may be conveniently and flexibly updated to include connection information for logging in to each other. Thus, connections between various devices 120 may be easily established, even if the particular devices have not previously communicated with each other directly.

Figure 7:
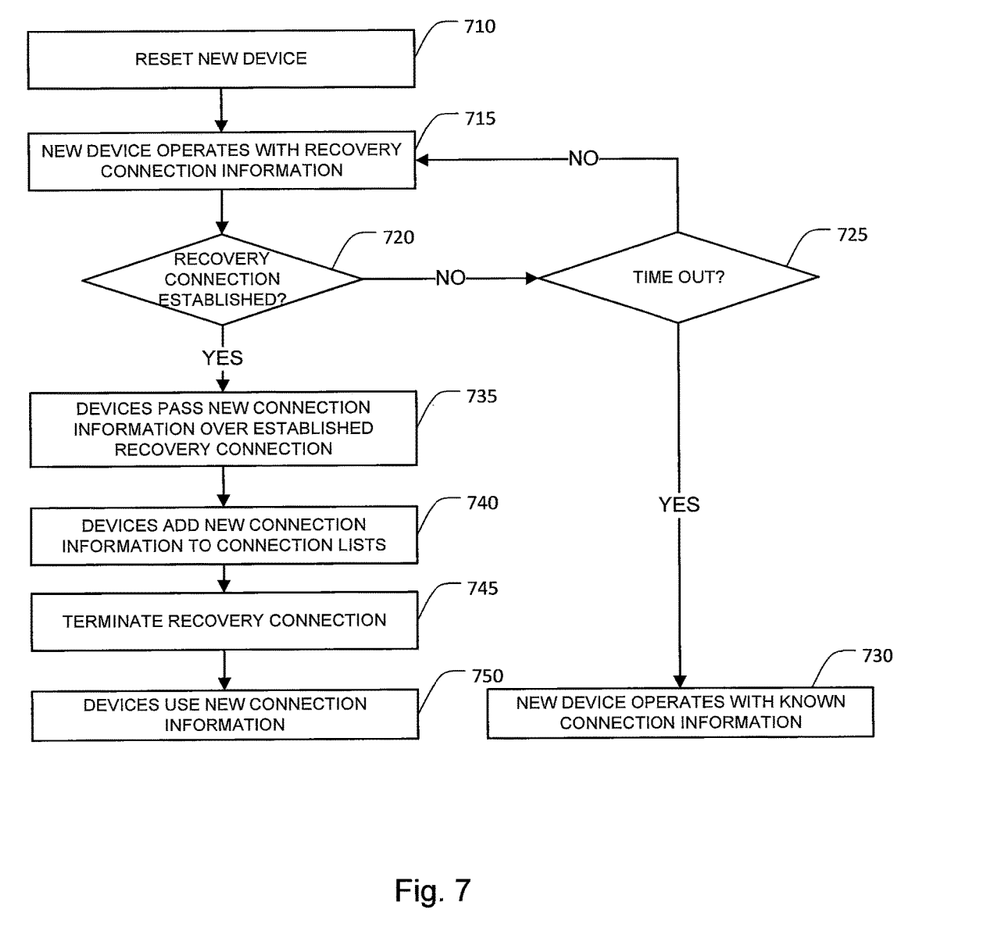
FIG. 7 illustrates a process to recover connection information in accordance with an embodiment of the present disclosure.

FIG. 7 illustrates a process to recover connection information in accordance with an embodiment of the present disclosure. For example, the process of FIG. 7 may be performed to permit various devices to log in to a newly added device for which no other connection information is available.

In block 710, a newly added device such as new device 120C is reset into a recovery state, for example, by a user toggling power source 121 (e.g., in a predetermined pattern) which causes new device 120C to boot into the recovery state. In this regard, such a reset into the recovery state may be distinguished from a normal reset that occurs with a conventional powering on of new device 120C (e.g., discussed with regard to blocks 415 and 515 of FIGS. 4 and 5).

In block 715, new device 120C operates in the recovery state in accordance with recovery connection information (e.g., connection information including an SSID and passphrase that are publicly known). For example, in one embodiment, new device 120C may operate as an access point broadcasting a publicly known SSID and waiting to receive a log in from user device 120A or 120B with the publicly known passphrase. In another embodiment, new device 120C may operate as an access point waiting to receive a log in from user device 120A or 120B with the publicly known passphrase, but without broadcasting the publicly known SSID (e.g., so as not to risk indicating entering a recovery mode to an eavesdropper).

In a further embodiment, new device 120C may operate as a station searching for a publicly known SSID and seeking to log in to user device 120A or 120B using the publicly known passphrase, regardless of whether the known SSID is being broadcast or not. In some embodiments, the recovery connection information may be stored as one of connection entries 310 in connection list 226.

If no recovery connection is established (block 720), then new device 120C continues looping through blocks 715, 720, and 725 until a predetermined time (e.g., several minutes) has elapsed (block 725). After the time out occurs, the process continues to block 730 where new device 120C reverts to operating with other default or defined connection information.

If a recovery connection is established between new device 120C and one of user devices 120A or 120B (block 720), then the connected devices pass new connection information corresponding to one or more defined (e.g., non-default) connections, and this information may be passed securely over the already established recovery connection (block 735). For example, user device 120A or 120B may pass new connection information to new device 120C for a new defined (e.g., non-default) connection. In block 740, new device 120C adds this new defined connection information to connection list 226 as a new or updated defined connection entry. Although blocks 735 and 740 have been discussed in relation to user device 120A or 120B providing new defined connection information to new device 120C, it is also contemplated that such information may be provided from new device 120C to user device 120A or 120B where appropriate.

In block 745, the recovery connection previously established in block 720 is terminated. Thereafter, in block 750, the devices 120 begin using the new connection information, for example, in accordance with the techniques discussed with regard to FIGS. 4 and 5.

As used herein, reference to various of devices 120 operating as access points or as stations includes one or more devices in the network operating in a Wi-Fi Direct mode, and methods similar to those described herein may be used to enhance the security of the network including at least one Wi-Fi Direct capable device by establishing a secure default connection to the at least one Wi-Fi Direct capable device and passing defined connection information over the secure default connection to establish a secure defined connection, as described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   storing, on a first device, a connection list comprising a plurality of connection entries;
   selecting, by the first device, a default connection entry in the connection list;
   establishing a secure default connection between the first device and a second device using the default connection entry;
   receiving, at the first device over the secure default connection, defined connection information from the second device;
   storing the defined connection information in a defined connection entry of the connection list;
   terminating the secure default connection to switch to a secure defined connection; and
   establishing the secure defined connection between the first device and the second device using the defined connection entry.

2. The method of claim 1, wherein the establishing a secure default connection comprises selectively configuring the first device as a station or an access point based on the selected default connection entry.

3. The method of claim 1, wherein the establishing the secure defined connection comprises attempting to establish a secure connection using each of the connection entries in the connection list until the secure default connection is established using the defined connection entry.

4. The method of claim 1, further comprising:
   receiving, at the first device over the secure defined connection, additional defined connection information associated with a third device; and
   storing the additional defined connection information in an additional defined connection entry of the connection list.

5. The method of claim 1, wherein the defined connection entry is a preexisting defined connection entry, wherein the storing the defined connection information comprises updating the preexisting defined connection entry.

6. The method of claim 1, wherein the selecting a default connection entry is performed in response to a powering on of the first device.

7. The method of claim 1, wherein the default connection entry is associated with a serial number of the first device.

8. The method of claim 1, wherein each connection entry comprises a Service Set Identification (SSID), a passphrase, and an operating mode designation.

9. The method of claim 1, wherein the default connection entry is a recovery connection entry comprising a publicly available Service Set Identification (SSID) and a publicly available passphrase.

10. The method of claim 1, wherein the first device is a radar system configured to be installed on a watercraft, wherein the second device is a user device configured to display radar return information from the radar system received over the secure defined connection.

11. A system comprising:
a first device comprising:
a memory component configured to store a connection list comprising a plurality of connection entries;
a network interface; and
a processor configured to:
select a default connection entry in the connection list,
establish a secure default connection between the first device and a second device through the network interface using the default connection entry,
receive, over the secure default connection, defined connection information from the second device,
store the defined connection information in a defined connection entry of the connection list,
terminate the secure default connection to switch to a secure defined connection, and
establish the secure defined connection between the first device and the second device through the network interface using the defined connection entry.

12. The system of claim 11, wherein the processor is configured to selectively configure the first device as a station or an access point based on the selected default connection entry.

13. The system of claim 11, wherein the processor is configured to attempt to establish a secure connection using each of the connection entries in the connection list until the secure default connection is established using the defined connection entry.

14. The system of claim 11, wherein the processor is configured to:
receive, at the first device over the secure defined connection, additional defined connection information associated with a third device; and
store the additional defined connection information in an additional defined connection entry of the connection list.

15. The system of claim 14, further comprising the second device and the third device.

16. The system of claim 11, wherein the defined connection entry is a preexisting defined connection entry, wherein the processor is configured to update the preexisting defined connection entry with the defined connection information.

17. The system of claim 11, wherein the processor is configured to select the default connection entry in response to a powering on of the first device.

18. The system of claim 11, wherein the default connection entry is associated with a serial number of the first device.

19. The system of claim 11, wherein the default connection entry is a recovery connection entry comprising a publicly available Service Set Identification (SSID) and a publicly available passphrase.

20. The system of claim 11, wherein the first device is a radar system configured to be installed on a watercraft, wherein the second device is a user device configured to display radar return information from the radar system received over the secure defined connection.

* * * * *